United States Patent [19] [11] Patent Number: 5,005,788
Capewell [45] Date of Patent: Apr. 9, 1991

[54] GEARED ROTARY ACTUATOR

[75] Inventor: Terence J. Capewell, Wheaton Aston, England

[73] Assignee: Lucas Industries Public Limited Co., Birmingham, England

[21] Appl. No.: 460,518

[22] Filed: Jan. 3, 1990

Related U.S. Application Data

[62] Division of Ser. No. 301,150, Jan. 25, 1989, Pat. No. 4,932,929.

[30] Foreign Application Priority Data

Feb. 6, 1988 [GB] United Kingdom ............... 8802714
Jun. 15, 1988 [GB] United Kingdom ............... 8814200

[51] Int. Cl.$^5$ ............................................... B64C 13/34
[52] U.S. Cl. ............................... 244/231; 244/76 A; 475/205; 475/330
[58] Field of Search .............. 244/231, 76 A, 75 R; 74/665 R, 665 K, 655 GA; 475/205, 329, 330

[56] References Cited

U.S. PATENT DOCUMENTS 2,826,937 3/1958 Ochtman ........................... 244/231
2,932,473 4/1960 Kass et al. ........................ 244/90 R
4,683,407 7/1987 Barba et al. ..................... 244/76 A Primary Examiner—Galen Barefoot
Assistant Examiner—Christopher P. Ellis
Attorney, Agent, or Firm—Staas & Halsey

[57] ABSTRACT

A geared rotary actuator comprises at least two axially aligned compound epicyclic gear trains driven by an input shaft so that output ring gears in each train rotate relatively. Sun gears in adjacent gear trains are drivingly coupled to the input shaft through a differential device which permits limited rotational displacement between the sun gears. An element, for example an aircraft lift control surface, may be mounted on one set of the ring gears by means of spindles which extend normally of a plane which includes the axes of the ring gears, so that as a result of stresses therein the element may tilt locally about the spindles.

6 Claims, 11 Drawing Sheets

5,005,788

GEARED ROTARY ACTUATOR

This is a divisional of co-pending application Ser. No. 07/301,150 filed on Jan. 25, 1989, issued June 12, 1990 as U.S. Pat. No. 4,932,929.

BACKGROUND OF THE INVENTION

This invention relates to geared rotary actuators for aircraft lift control surfaces.

It is known, for example from PCT Application W086/00968 that a rotary actuator for aircraft lift control surfaces may comprise a plurality of axially aligned compound epicyclic gear trains which are coupled to a common input shaft, each of the gear trains having one or more first output elements coupled to an aircraft wing and one or more second output elements coupled to the control surface.

The present invention provides an actuator comprising an input shaft, at least two substantially axially aligned gear trains, each gear train having a sun input gear drivingly connected to said input shaft, a plurality of compound planet gears, each having a first pinion and two second pinions, said pinions being secured together for rotation in unison, said first pinion meshing with said sun input gear and with a first output ring gear, and second output ring gears drivingly coupled for rotation by respective ones of said second pinions.

When an aircraft lift control surface is deployed, aerodynamic forces urge it to flex in a direction opposite to that of the wing. This flexure imposes varying loads and stiffness distribution on the actuator over its length. Since the gear trains are driven by a common input shaft, each of the gear trains attempts to drive its first and second output ring gears at an identical relative speed, irrespective of variations in load and stiffness. The forces resulting from these variations impose additional loads within the actuator and tend to increase torsion on the elements of the gear trains. In one of its aspects the invention has as an object to balance the torque loads between the gear trains.

SUMMARY OF THE INVENTION

This object is achieved by an actuator as above defined, further comprising means for permitting limited rotational movement between the sun gears of adjacent gear trains.

In a further of its aspects the invention has as an object to provide flexible connections between said second output ring gears and a wing or control surface on which they are, in use, mounted.

This object is achieved by an actuator as initially defined which includes an element adapted to be secured to a surface of the aircraft and means for mounting said element on a second output ring gear so that said element has limited rotation relative to said second ring gear about an axis perpendicular to a plane containing the ring gear axes.

BRIEF DESCRIPTION OF THE DRAWINGS

Embodiments of the invention will now be described by way of example only and with reference to the accompanying drawings.

DETAILED DESCRIPTION OF THE PREFERRED EMBODIMENTS

Figure 1:
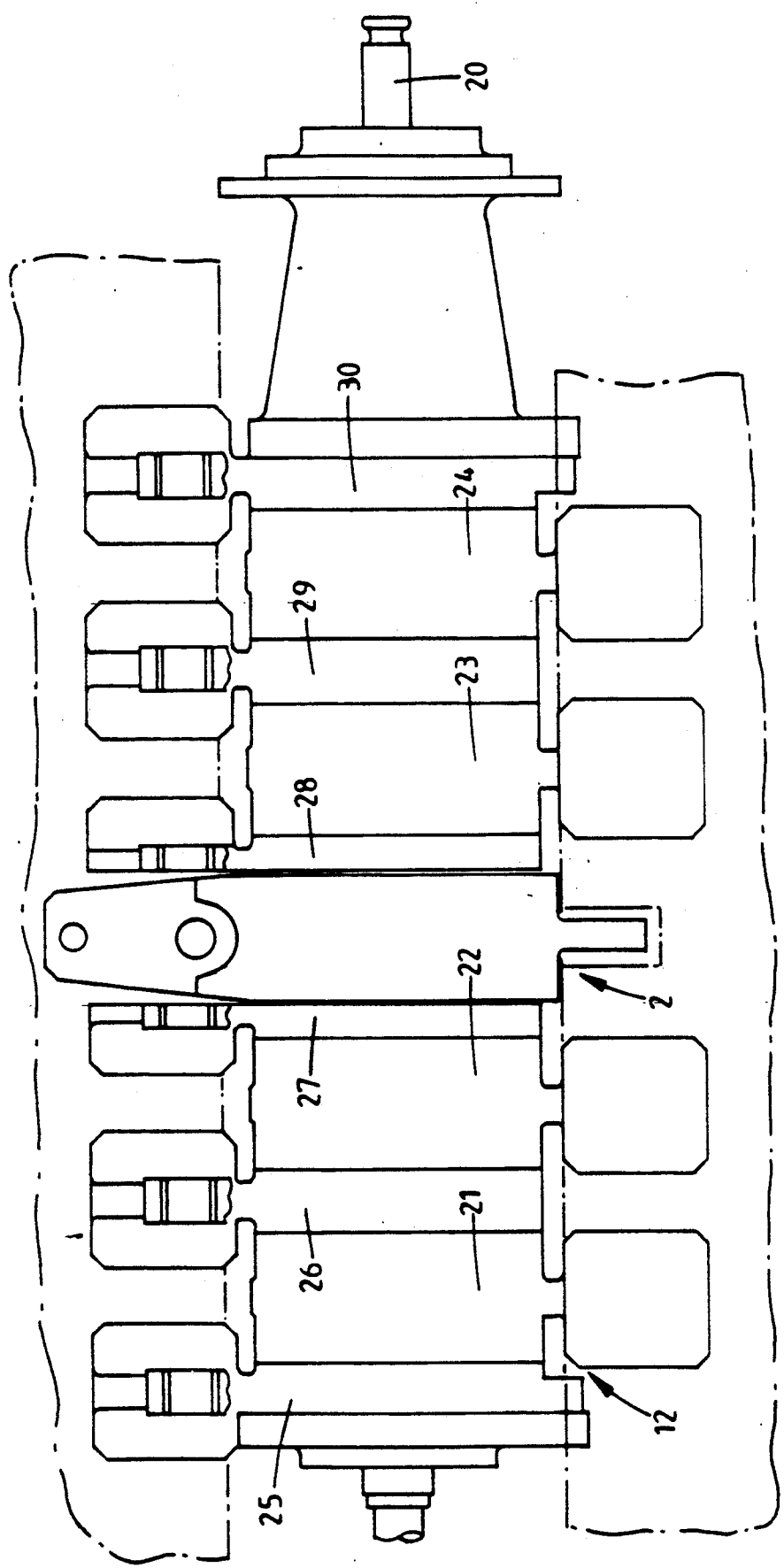
FIG. 1 is an external view of a rotary actuator having four compound epicyclic gear trains.

The actuator shown in FIG. 1 has an input shaft 20 which can induce relative rotation between a set of first output ring gears 21, 22, 23, 24 and a set of second output ring gears 25, 26, 27, 28, 29, 30. The actuator comprises four compound epicyclic gear trains each of which is driven by the shaft 20 and provides output torque to one of the first ring gears 21–24 and to two of the second ring gears 25–30. The ring gears 26, 29 are each driven by two of the gear trains.

Figure 2:
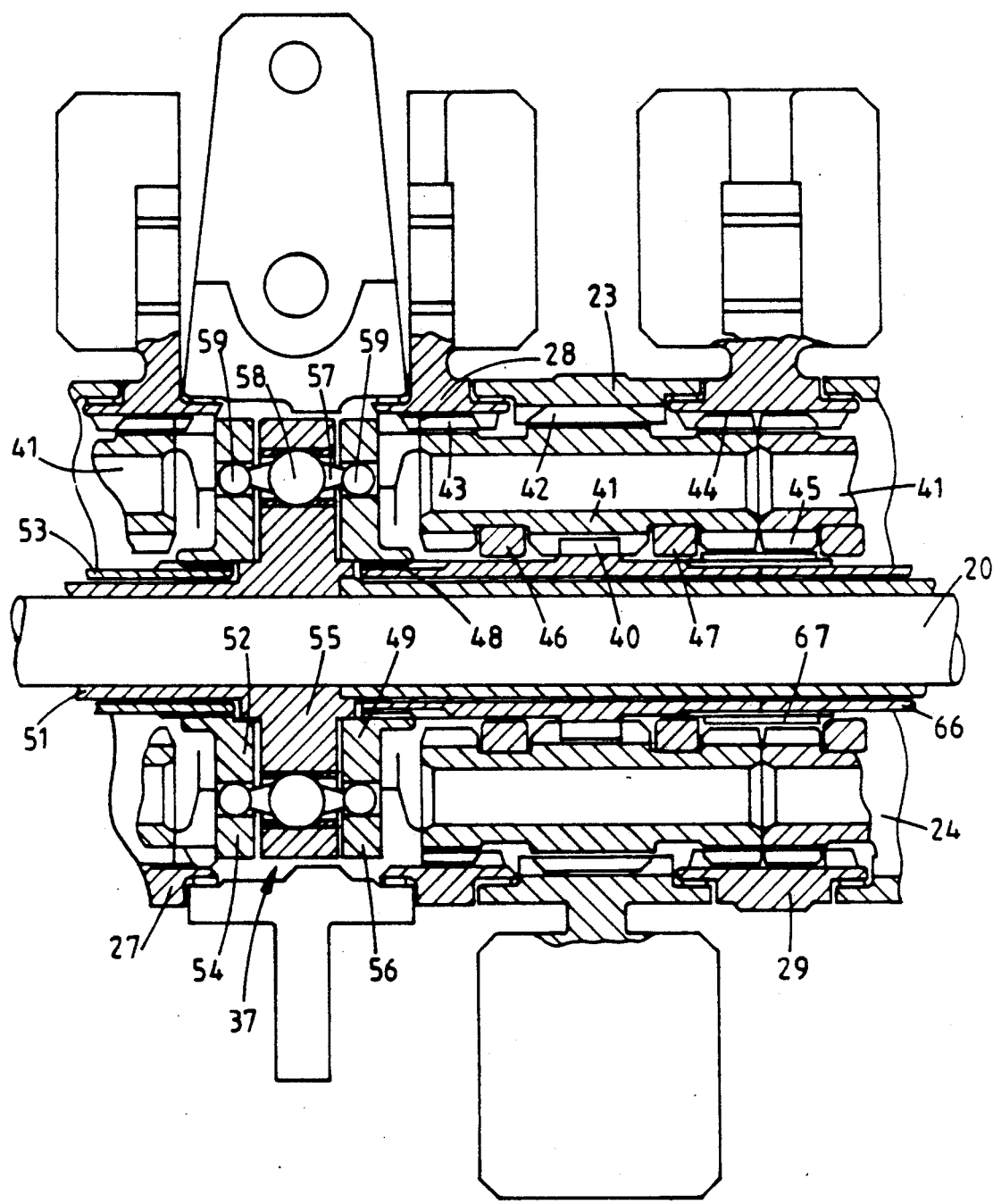
FIG. 2 is a longitudinal section to an enlarged scale of a part of FIG. 1 indicated by arrow 2 thereon.

As shown in FIG. 2 each gear train comprises a sun gear 40 which is drivingly coupled to the shaft 20 in a manner to be described. A plurality of compound planet gears 41 each comprises a first pinion 42 which, in the gear train illustrated, meshes with the ring gear 23. The planet gear 41 also comprises identical second pinions 43, 44 having a different number of teeth to the pinion 42. The pinions 43, 44 mesh with respective ring gears 28, 29. The ring gear 30 also meshes with second pinions 45 of compound planet gears in an adjacent gear train. Each of the planet gears 41 is maintained in its radial position by a pair of rings 46, 47 which engage grooves in the planet gear 41. The sun gear 40 is coupled by splines 48 to a plate 49.

The sun gear 40 is coupled by a differential device 37 to the shaft 20 and to a sun gear 53 which forms part of the gear train which provides a drive to the ring gears 22, 26, 27. The device 37 comprises a first plate 49 which is coupled by splines 48 to the sun gear 40. A second plate 52, has a splined connection to the sun gear 53. A third plate 55 lies between the plates 49, 52 and has an integral sleeve 51 which is drivingly connected to the shaft 20.

The plates 49, 52, 55 lie in planes normal to the axis of the shaft 20 and each of the plates 49, 52, 55 has six through holes which are equi-angularly spaced and aligned with corresponding holes on the other two plates. The plates 49, 52, 55 are coupled by lever elements 57 each of which has a larger spherical portion 58 pivotally engaged in a hole in the plate 55, and two smaller spherical portions pivotally engaged in holes in the plates 49, 52.

The arrangement is such that rotation in one direction of plate 52 relative to the plate 55 is accompanied by pivotal movements of the lever elements 57 resulting in corresponding relative rotation in the opposite direction of the plate 49. During this relative rotation the lever elements 57 pivot about the median plane of the plate 55. It will be apparent that if rotation of the plate 49 is arrested or slowed as a result of increase in torque load on, for example, the ring gear 23, the plate 52 will be driven by the plate 55 at an increased angular velocity relative to the latter and in the same direction. The plates 49, 55, 52 and the lever elements 57 therein thus act as a differential device which connects the input shaft 20 to the sun gears 40, 53. The effect is that an increased torque load on, for example, the ring gear 23 does not result in the entire torque of the actuator being applied to that gear. Instead the sun gear 53 is driven against the relatively lower torque load on the gear 22 arising as a result of flexure of the wing or control surface. The lever 57 will pivot about its portion 58 until relative rotation between the sun gears 40, 53 results in a balanced torque on the ring gear 23, 22.

The arrangement of gear trains and their respective connections to the wing and the aircraft control surface are such that torque balance as above described would be achieved as a result of not more than 5° pivotal movement of the levers 57. A torque difference between adjacent gear trains which results from abnormal operation of the actuator and which would require more than 5° of movement of the levers 57 may be accompanied by an unacceptably high torque on the input shaft 20, and a known form of torque-limiting brake may be coupled to the shaft 20, to prevent damage to the actuator or to structural elements on which it is mounted.

It will be seen from FIG. 2 that the sun gear 40 drives an aligned sun gear 66 by way of a splined collar 67 which engages adjacent ends of the sun gears 40, 66. A similar arrangement exists in respect of the sun gear 53 and a further sun gear (not shown) aligned therewith.

Figure 3:
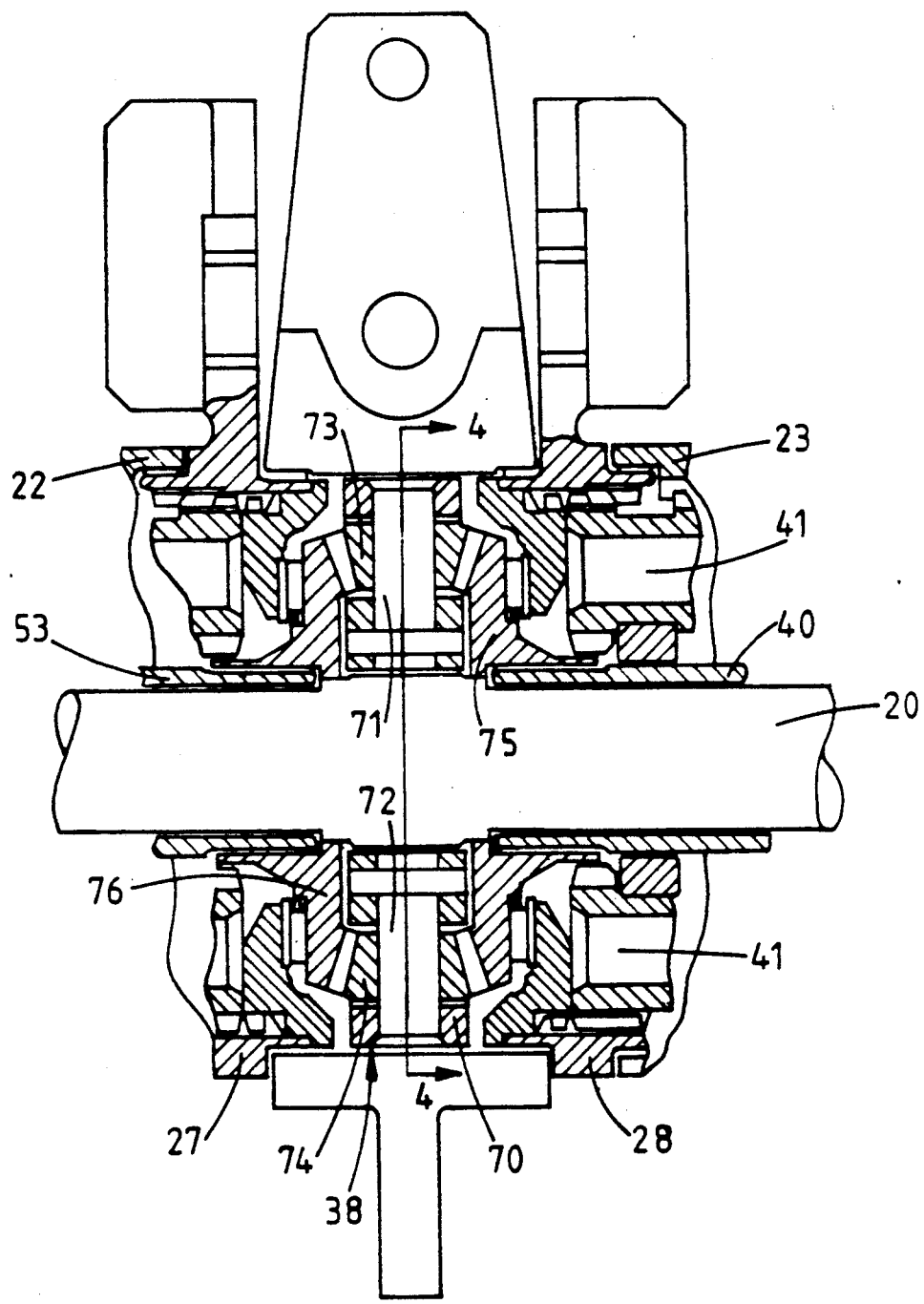
FIG. 3 is an alternative construction of the part 2 of FIG. 1.
Figure 4:
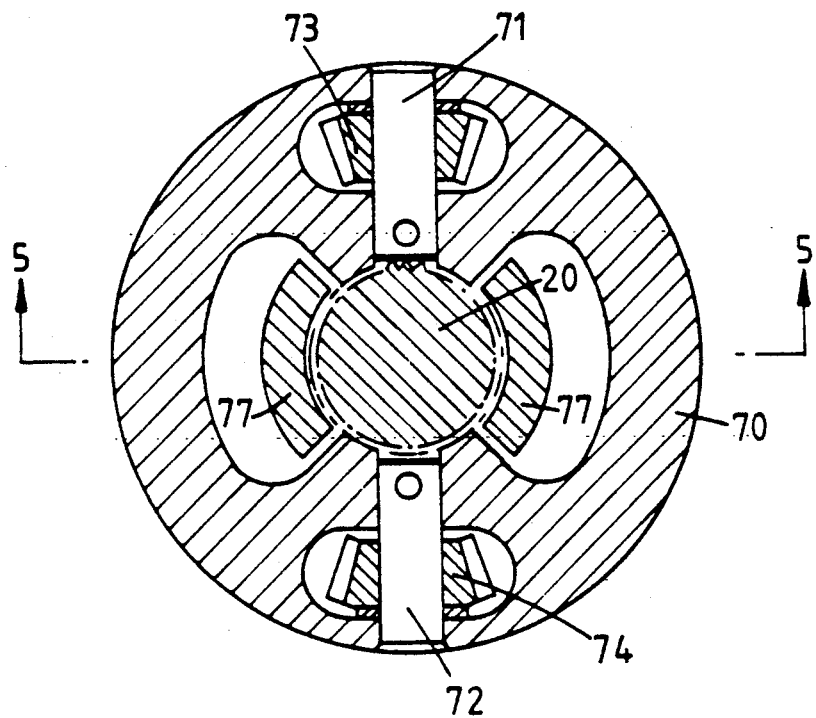
FIG. 4 is a section on line 4—4 in FIG. 3.
Figure 5:
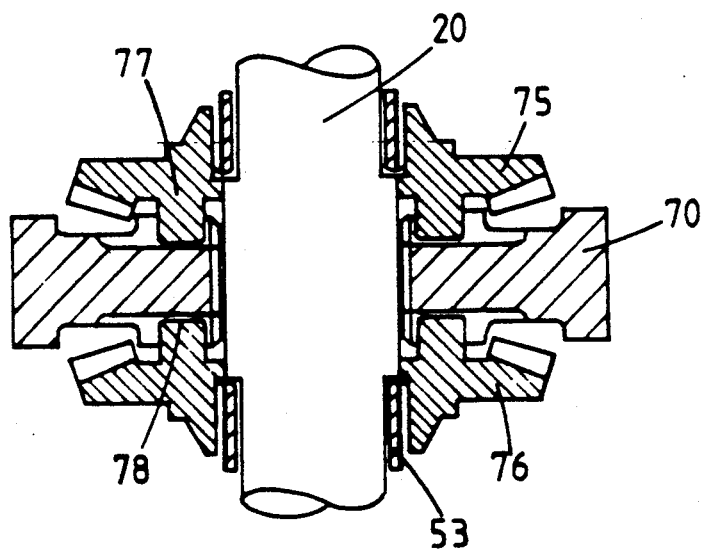
FIG. 5 is a section on line 5—5 in FIG. 4.

FIGS. 3–5 show an alternative form of differential arrangement, parts corresponding to those in FIG. 2 having identical reference numbers. In this alternative the input shaft 20 is splined to a carrier 70 which supports two pins 71, 72 whose axes intersect that of the shaft 20. Bevel gears 73, 74 are freely rotatable on the respective pins 71, 72 and mesh with crown wheels 75, 76 which are in splined connection with respective sun gears 40, 53. As shown in FIGS. 4 and 5 the crown wheels 75, 76 have drive dogs 77, 78 which are engageable with abutments on the carrier 70 to limit rotation of the gears 75, 76 relative to the carrier 70 to 5° either side of the central positions shown in the drawings. The arrangement shown in FIGS. 3–5 thus acts in the same manner as that described with reference to FIG. 2.

Figure 6:
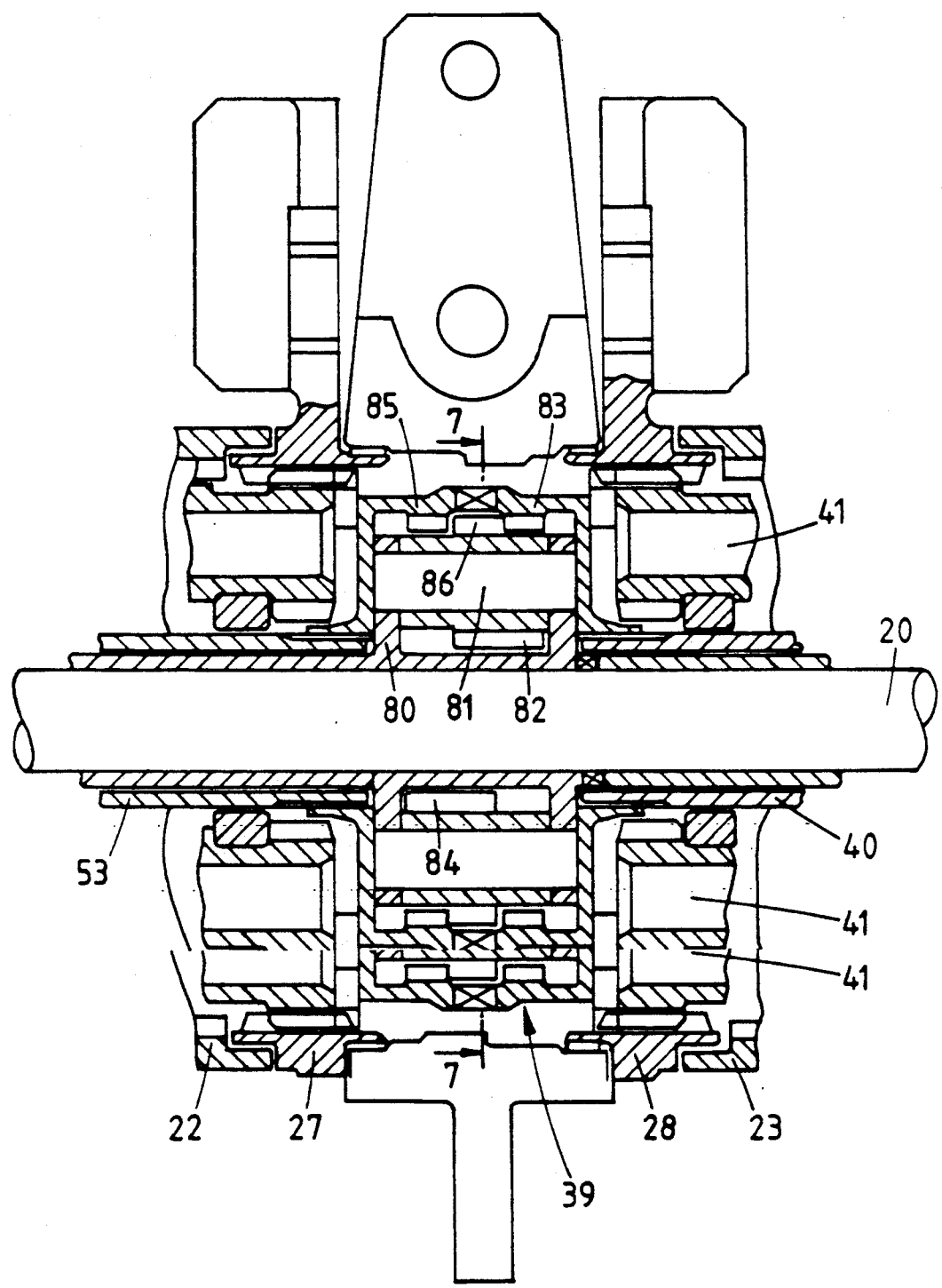
FIG. 6 is another alternative construction of the part 2 of FIG. 1.
Figure 7:
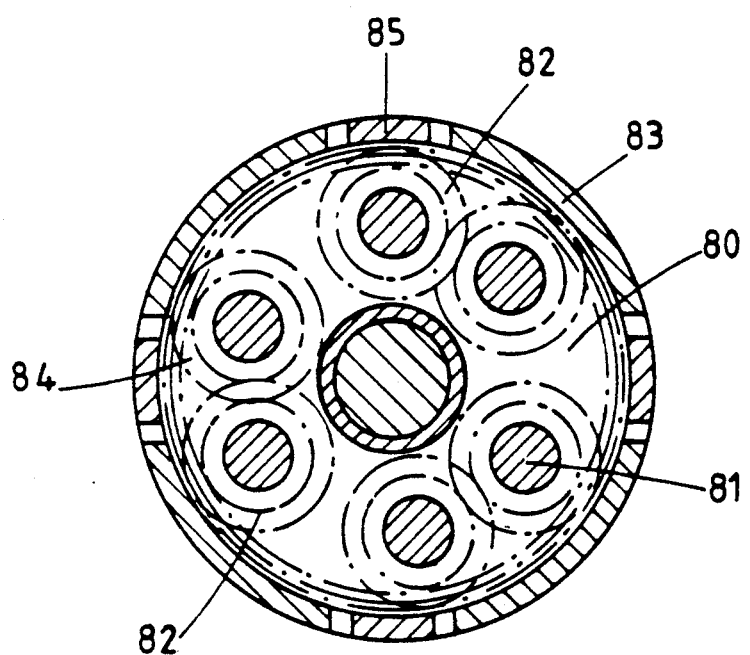
FIG. 7 is a section on line 7—7 in FIG. 6.

A further alternative differential arrangement is shown in FIGS. 6 and 7, parts corresponding to those of FIGS. 2 and 3 having identical reference numbers. The differential arrangement has a carrier element 80 which is drivingly coupled to the input shaft 20. As shown in FIG. 7 six pins 81 are mounted in the carrier 80 at equal radii from the axes thereof. The pins 81 are grouped in pairs, one pin in each pair carrying a pinion 82 which meshes with a ring gear 83, and the other pin in each pair carries a pinion 84 which meshes with a ring gear 85. Pairs of pinions 82, 84 are also in mesh as shown in FIG. 7.

The ring gears 83, 85 are in splined connection with respective sun gears 40, 53. As shown in FIG. 6 the ring gears 83, 85 have interengaged dogs and abutments which permit their relative rotation 5° to either side of the central position shown.

In use, when the torque loads on the sun gears 40, 53 are equal the ring gears 83, 85 remain in the relative positions shown in FIG. 7 and there is no relative rotation between pinions 82, 84. If the torque load on the sun gear 40, for example, becomes greater than that on the sun gear 53, relative movement of the ring gear 83 causes the pinions 82 to rotate about the pins 81 in direction opposite to that of rotation of the shaft 20 about its axis. The carrier 85 is thereby rotated relative to the shaft 20, in the same direction as the latter, by the pinions 82 acting through the pinions 84. The sun gear 53 is thereby driven to maintain a balanced torque to the output ring gears, in the manner described with reference to FIG. 2.

Figure 8:
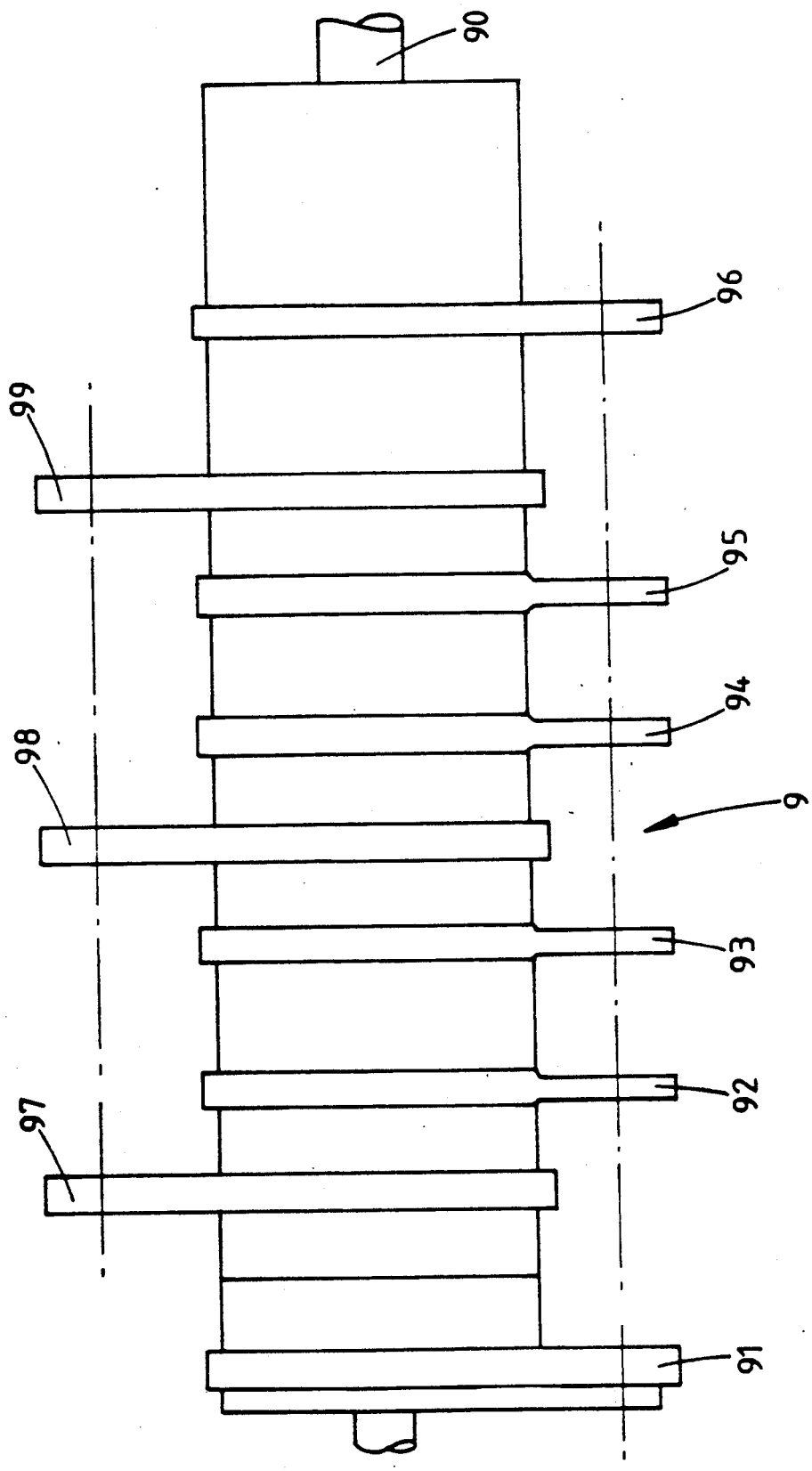
FIG. 8 is an external view of a rotary actuator having three compound epicyclic gear trains.
Figure 9:
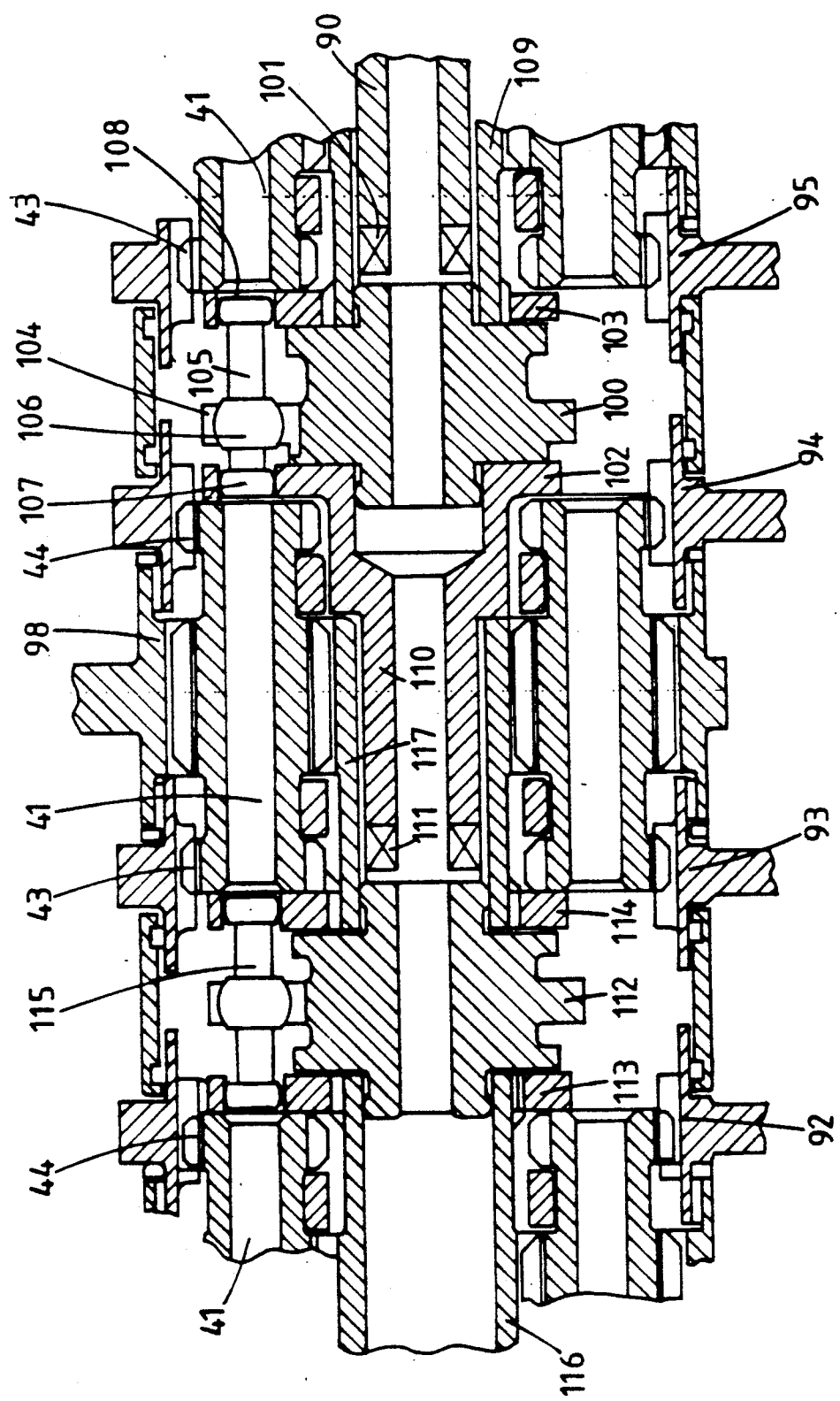
FIG. 9 is a longitudinal section to an enlarged scale of a part of FIG. 8 indicated by arrow 9 thereon.

The actuator shown in FIG. 8 has three compound epicyclic gear trains driven by a hollow input shaft 90 to induce output ring gears 91–96, which are coupled for movement in unison, to rotate relative to ring gears 97–99, which are also coupled for movement in unison. As shown in FIG. 9 the shaft 90 is drivingly coupled to a plate 100 through dogs 101. The plate 100 lies between two further plates 102, 103 and has a plurality of radial slots 104 in its periphery. The plates 100, 102, 103 are coupled by elements 105 which have part-spherical portions 106 engaged in respective ones of the slots 104. Each element 105 has two further part-spherical portions 107, 108 which engage apertures in the plates 102, 103 respectively. The distance between the centres of portions 106, 108 is twice that between the centres of portions 106, 107.

The plate 103 is drivingly coupled to a sun gear 109 which forms part of the gear train which rotates the ring gears 95, 96, 99. The plate 102 includes a sleeve 110 which is coupled through dogs 111 to a plate 112 which lies between further plates 113, 114. A plurality of lever elements 115 couple the plates 112, 113, 114 in a manner similar to that of the plates 100, 102, 103, the centers of the outer part-spherical portions of the elements 115 being equidistant from the centre portions thereof. The plates 113, 114 are drivingly coupled to respective sun gears 116, 117 of adjacent gear trains.

Figure 12:
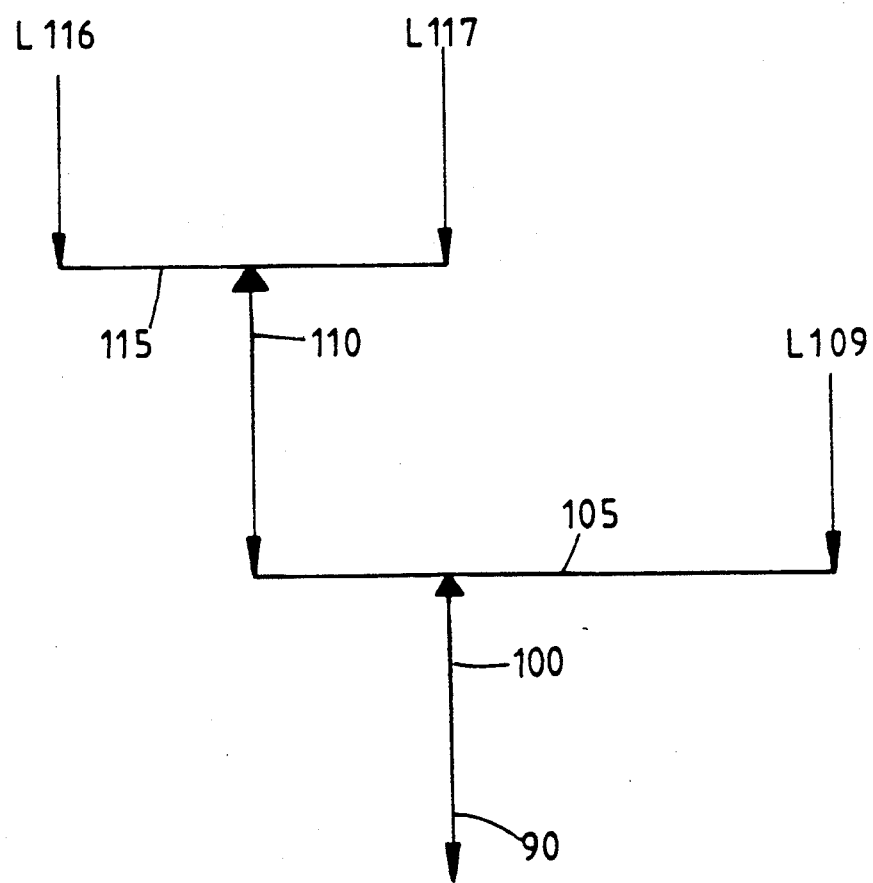
FIG. 12 is a diagram of the operative effect of the arrangement of FIG. 9

The effect of the arrangement is best understood with reference to FIG. 12, in which L109, L116, L117 indicate the torque loads on the respective sun gears 109, 116, 117. The torques on gears 116, 117 are rendered equal by the differential device 112, 115 and the sum of those torques is applied to the differential device 100, 105. The 2:1 ratio of the device 100, 105 has the effect that the torque on gear 109 is equal to that on each of the gears 116, 117. The sum of the balanced torques on gears 109, 116, 117 is equal to the torque on the shaft 90.

Figure 10:
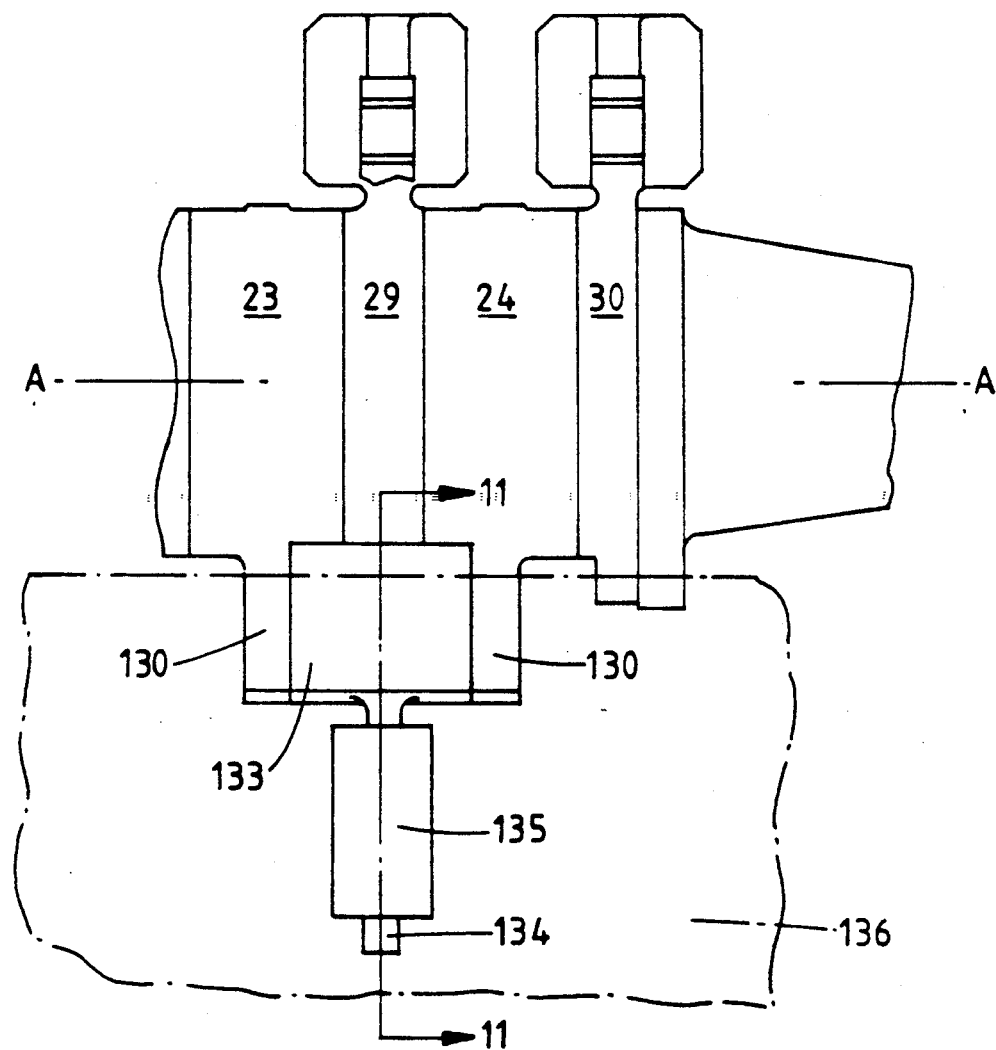
FIG. 10 shows a modification of a part of FIG. 1.
Figure 11:
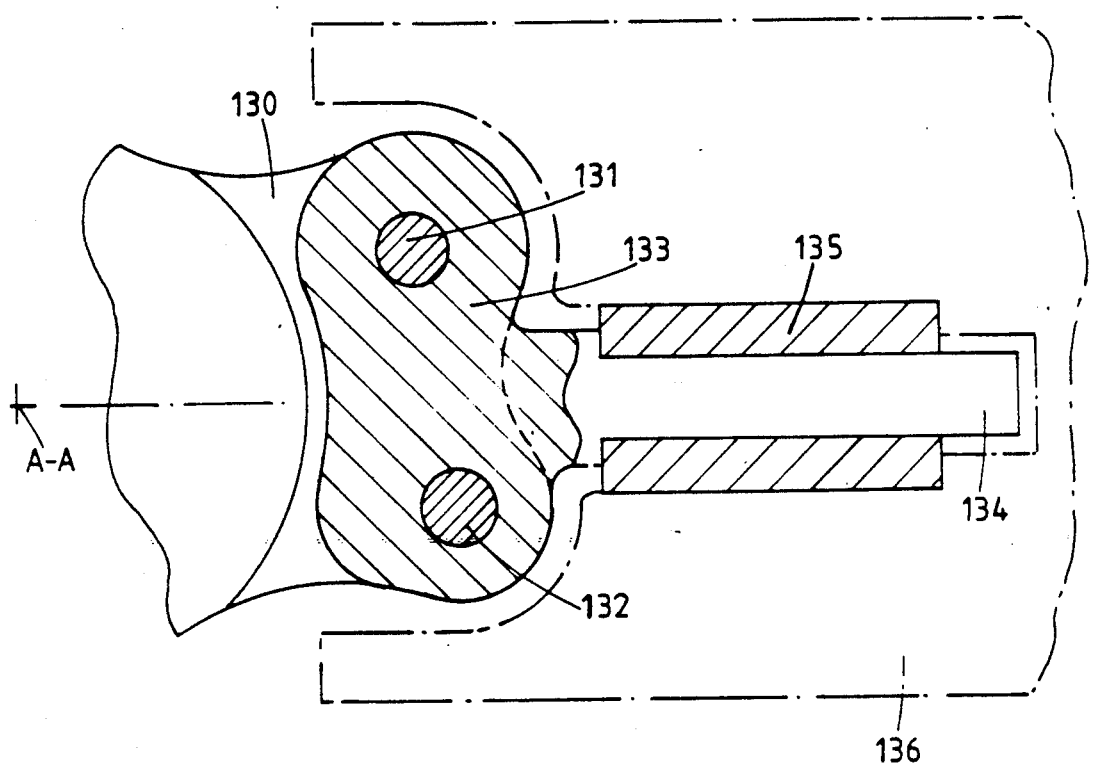
FIG. 11 is a section on line 11—11 in FIG. 10.

FIGS. 10 and 11 show a modification in which the ring gears 23, 24 are provided with lugs 130 for effecting connection to an aircraft control surface 136. Each lug 130 has two holes, and pins 131, 132 coupled to adjacent lugs 130 in pairs, thereby ensuring their movement in unison. A bracket 133 is mounted on the pins 131, 132 and carries a spindle 134 which extends normally of a plane of the axis A—A of the ring gears of the actuator. The spindle 134 supports a bearing 135 on which the aircraft control surface 136 is mounted. Adjacent the spindle 134 the surface 136 may thereby flex about the axis of the spindle 134.

Though the axis of the spindle 134 is, in the example, shown as intersecting the axis A—A, it will be understood that need not be so, provided that the axis of the spindle 134 lies in a plane which is normal to a plane containing the axis A—A. It will also be understood that the ring gears 21, 22 (FIG. 1) will be provided with a similar arrangement so that the control surface 136 may tilt locally about the spindles 134 as a result of flexure in opposite directions of the surface 136 and a wing on which it is mounted.

I claim:

1. A rotary actuators for an aircraft lift control surface, comprising a plurality of axially aligned compound epicyclic gear trains each having relatively rotatable first and second output ring gears, a coupling joining adjacent ones of said first ring gears for movement in unison, and a spindle carried by said coupling and extending normally of a plane which contains the axes of the ring gears, said control surface being mounted, in use, on said spindle.

2. An actuator as claimed in claim 1 which includes a bearing bush on said spindle, for engaging said control surface.

3. An actuator as claimed in claim 1 in which said adjacent ring gears are provided with respective lugs, said coupling extending between said lugs.

4. An actuator as claimed in claim 3 in which said coupling comprises a plurality of pins extending between said lugs, and said spindle is carried by a bracket which is mounted on said pins.

5. An actuator as claimed in claim 2 in which said adjacent ring gears are provided with respective lugs, said coupling extending between said lugs.

6. A rotary actuator for an aircraft lift surface comprising an input shaft at least two axially aligned gear trains each gear train having an input sun gear drivingly connected to said input shaft a plurality of compound planet gears each having a first pinion and two second pinions said first and second pinions being secured together for rotation in unison, said first pinion meshing with said sun gear and with a first output ring gear and second output ring gears drivingly coupled for rotation by respective ones of said second pinions, said sun gears in adjacent gear trains being drivingly coupled to said shaft through a differential device for permitting limited rotational displacement between said sun gears in adjacent gear trains, a coupling joining adjacent ones of said first ring gears for movement in unison, and a spindle carried by said coupling and extending normally of a plane which contains the axes of the ring gears, said control surface being mounted, in use, on said spindle.

* * * * *